US012586252B2

(12) United States Patent
Seo et al.

(10) Patent No.: US 12,586,252 B2
(45) Date of Patent: Mar. 24, 2026

(54) METHOD FOR ENCODING THREE-DIMENSIONAL VOLUMETRIC DATA

(71) Applicants: Kwangwoon University Industry-Academic Collaboration Foundation, Seoul (KR); YESH COMPANY CO., LTD., Seoul (KR)

(72) Inventors: Young Ho Seo, Seoul (KR); Eui Seok Hwang, Suwon-si (KR)

(73) Assignees: Kwangwoon niversity Industry-Academic Collaboration Foundation, Seoul (KR); YESH COMPANY CO., LTD., Seoul (KR)

( * ) Notice: Subject to any disclaimer, the term of this patent is extended or adjusted under 35 U.S.C. 154(b) by 172 days.

(21) Appl. No.: 18/391,837

(22) Filed: Dec. 21, 2023

(65) Prior Publication Data

US 2025/0200813 A1 Jun. 19, 2025

(30) Foreign Application Priority Data

Dec. 19, 2023 (KR) ........................ 10-2023-0185796

(51) Int. Cl.
*G06T 9/00* (2006.01)
*G06T 7/55* (2017.01)
*G06T 19/20* (2011.01)

(52) U.S. Cl.
CPC ................ *G06T 9/001* (2013.01); *G06T 7/55* (2017.01); *G06T 19/20* (2013.01);
(Continued)

(58) Field of Classification Search
None
See application file for complete search history.

(56) References Cited

U.S. PATENT DOCUMENTS

| | | | | |
|---|---|---|---|---|
| 12,033,281 B2 * | 7/2024 | Rajasekaran | ........ | G06V 20/653 |
| 12,361,662 B2 * | 7/2025 | Grigorev | ................ | G06T 17/20 |

(Continued)

FOREIGN PATENT DOCUMENTS

| | | |
|---|---|---|
| JP | 2008015895 A | 1/2008 |
| KR | 20120071299 A | 7/2012 |

(Continued)

OTHER PUBLICATIONS

Bhatnagar, Bharat Lal, et al. "Multi-garment net: Learning to dress 3d people from images." Proceedings of the IEEE/CVF international conference on computer vision. 2019. (Year: 2019).*

(Continued)

*Primary Examiner* — Ryan M Gray
(74) *Attorney, Agent, or Firm* — NKL LAW; Jae Youn Kim

(57) ABSTRACT

Disclosed is a method for encoding 3D volumetric data to estimate pose and shape data from 3D volumetric data, generate a 3D estimation model by applying the estimated data to a 3D template model, and encode residual data of the 3D volumetric data together with the 3D estimation model, and the method includes: (a) receiving 3D volumetric data; (c) estimating a 3D pose from the 3D volumetric data; (d) estimating a 3D shape from the 3D volumetric data; (e) generating a 3D estimation model by modifying a predefined 3D template model; (f) calculating a residual of the 3D volumetric data with respect to the 3D estimation model; and (h) generating the pose estimation data, the shape estimation data and data on the residual as transmission data. Accordingly, an amount of data in the 3D volumetric model is significantly reduced and complexity is reduced.

6 Claims, 8 Drawing Sheets

(52) U.S. Cl.
CPC ...... *G06T 2200/04* (2013.01); *G06T 2210/16* (2013.01); *G06T 2219/2021* (2013.01)

(56) References Cited

U.S. PATENT DOCUMENTS

| | | | | |
|---|---|---|---|---|
| 2019/0244407 | A1* | 8/2019 | Wiesel | G06V 10/255 |
| 2019/0371080 | A1* | 12/2019 | Sminchisescu | G06T 17/20 |
| 2022/0189119 | A1* | 6/2022 | Seo | G06T 7/00 |
| 2022/0343547 | A1* | 10/2022 | Moguillansky | H04N 19/597 |
| 2025/0157114 | A1* | 5/2025 | Yuan | G06T 13/40 |

FOREIGN PATENT DOCUMENTS

| | | | |
|---|---|---|---|
| KR | 20200000106 | A | 1/2020 |
| KR | 20210018254 | A | 2/2021 |
| KR | 20220004716 | A | 1/2022 |
| KR | 10-2575567 | B1 | 9/2023 |

OTHER PUBLICATIONS

Saito, Shunsuke, et al. "Pifu: Pixel-aligned implicit function for high-resolution clothed human digitization." Proceedings of the IEEE/CVF international conference on computer vision. 2019. (Year: 2019).*
Chen, Xin, et al. "TightCap: 3D human shape capture with clothing tightness field." ACM Transactions on Graphics (TOG) 41.1 (2021): 1-17. (Year: 2021).*

* cited by examiner

FIG. 5(b)                        FIG. 5(c)

METHOD FOR ENCODING THREE-DIMENSIONAL VOLUMETRIC DATA

BACKGROUND OF THE INVENTION

1. Field of the Invention

The present invention relates to a method for encoding three-dimensional (3D) volumetric data to estimate pose and shape data from 3D volumetric data, generate a 3D estimation model by applying the estimated data to a 3D template model, and encode residual data of the 3D volumetric data together with the 3D estimation model.

2. Description of the Related Art

In general, a 3D volumetric data refers to data containing information about an object present in a 3D space. Unlike two-dimensional (2D) data, the 3D volumetric data includes height information so as to more realistically express a shape of the object.

The 3D volumetric data is expected to have the further expanding scope in use along with technological advancements. The data is used in computer graphics, medical imaging, scientific simulations and the like. For example, in the medical field, 3D images obtained from MRI or CT scans show detailed structures inside the human body, and the data is high-resolution and contains important medical information in each pixel (or voxel).

High-performance computing resources are required to process and visualize such large amounts of 3D data. Accordingly, advanced graphics processing technologies, efficient data storage and access schemes, and complex algorithms are essential. Technologies, such as GPU acceleration, parallel processing and data compression, are used for real-time visualization or analysis.

Particularly, in the virtual human field, 3D volumetric data is essential to generate and express a virtual human model. The virtual human model is generated based on 3D volumetric data, and the appearance, facial expressions, and motions of the virtual human model can be expressed through the 3D volumetric data.

In addition, the 3D volumetric data is used to generate virtual human content (see Patent Document 1). Various virtual human contents, such as movies, dramas and advertisements, can be produced by using the virtual human model.

In general, a 3D volumetric model obtained directly through a camera system or the like preserves vivid shapes and motions of a target object. Particularly, the above 3D volumetric model is composed of temporal sequences (multiple frames).

When compared to a 2D video, the 3D volumetric model is very complex and high capacity because volumetric data corresponding to each frame has a normal map, a material map, a diffusion map, and the like in addition to a mesh (or point cloud) and a texture. In addition, the 3D volumetric model is also very complex temporally because a structure of the geometric mesh (or point cloud) constituting the 3D volume is different for each frame.

Because the 3D volumetric data is very complex and high volume as above, an efficient encoding method is necessary to transmit or store a 3D volumetric data sequence. Because the mesh constituting each frame of the 3D volumetric data may have a very different geometric structure, it is difficult to compress the mesh by applying temporal correlation. Therefore, an encoding method different from the existing method is necessary.

PATENT DOCUMENT (Patent Document 1) Korean Patent Registration No. 10-2575567 (published on Sep. 7, 2023)

SUMMARY OF THE INVENTION

In order to solve the above-mentioned problem, the present invention provides a method for encoding 3D volumetric data to estimate pose and shape data from 3D volumetric data, generate a 3D estimation model by applying the estimated data to a 3D template model, and encode residual data of the 3D volumetric data together with the 3D estimation model.

In order to achieve the above mentioned object, a method for encoding 3D volumetric data according to the present invention includes the steps of: (a) receiving 3D volumetric data; (c) estimating a 3D pose from the 3D volumetric data; (d) estimating a 3D shape from the 3D volumetric data; (e) generating a 3D estimation model by modifying a predefined 3D template model by using estimated 3D pose data (hereinafter referred to as pose estimation data) and estimated 3D shape data (hereinafter referred to as shape estimation data); (f) calculating a residual of the 3D volumetric data with respect to the 3D estimation model; and (h) generating the pose estimation data, the shape estimation data and data on the residual as transmission data.

In addition, the method for encoding 3D volumetric data according to the present invention further includes (b) quantizing the 3D volumetric data.

In addition, step (c) or (d) of the method for encoding 3D volumetric data according to the present invention may include: obtaining a 2D image by projecting the 3D volumetric data onto a 2D plane, and estimating 3D pose or shape data from the 2D image.

In addition, step (c) or (d) of the method for encoding 3D volumetric data according to the present invention may include: obtaining 2D images from two or more viewpoints by projecting the 3D volumetric data onto two or more 2D planes, to estimate pose or shape data from the 2D images, thereby correcting or minimizing an error.

In addition, in the method for encoding 3D volumetric data according to the present invention, the 3D template model may be a model representing a 3D virtual human and capable of modifying the 3D virtual human using predetermined feature parameters, and in step (e), the 3D template model may be modified by setting the feature parameters of the 3D template model by using the pose estimation data and the shape estimation data.

In addition, in step (f) of the method for encoding 3D volumetric data according to the present invention, the 3D template model may include a 3D body template model representing a 3D virtual human body, and a 3D costume template model representing a 3D costume, and the shape estimation data may include body shape estimation data and an estimated costume template model, and in step (e), the 3D body template model may be modified by applying the pose estimation data and the body shape estimation data, the costume template model may be modified by applying the pose estimation data, and the 3D estimation model is generated by combining the modified costume template model with the modified 3D body template model.

In addition, in step (f) the method for encoding 3D volumetric data according to the present invention, the residual may be calculated by a difference between a 3D position in a space of the 3D volumetric data and a 3D position in a space of the 3D estimation model.

In addition, The present invention the method for encoding 3D volumetric data further includes: (g) newly defining a projected position and a projected angle when the residual is below a predetermined threshold level, and repeating steps (c) to (f).

In addition, in step (h) of the method for encoding 3D volumetric data according to the present invention, when two or more of the 3D template models are used, including data on the used 3D template models in the transmission data.

As described above, according to the method for encoding 3D volumetric data of the present invention, only the residual data between the 3D modification model and the 3D volumetric data is encoded, so that an amount of data of the 3D volumetric model can be significantly reduced and complexity can be reduced.

BRIEF DESCRIPTION OF THE DRAWINGS

FIGS. 5(a)-5(c) show exemplary screens of a process of estimating the pose of the 3D mesh according to one embodiment of the present invention, and includes (a) a 3D volumetric image, (b) projection images, and (c) 2D pose images.

DETAILED DESCRIPTION OF THE INVENTION

Figures 1A, 1B:
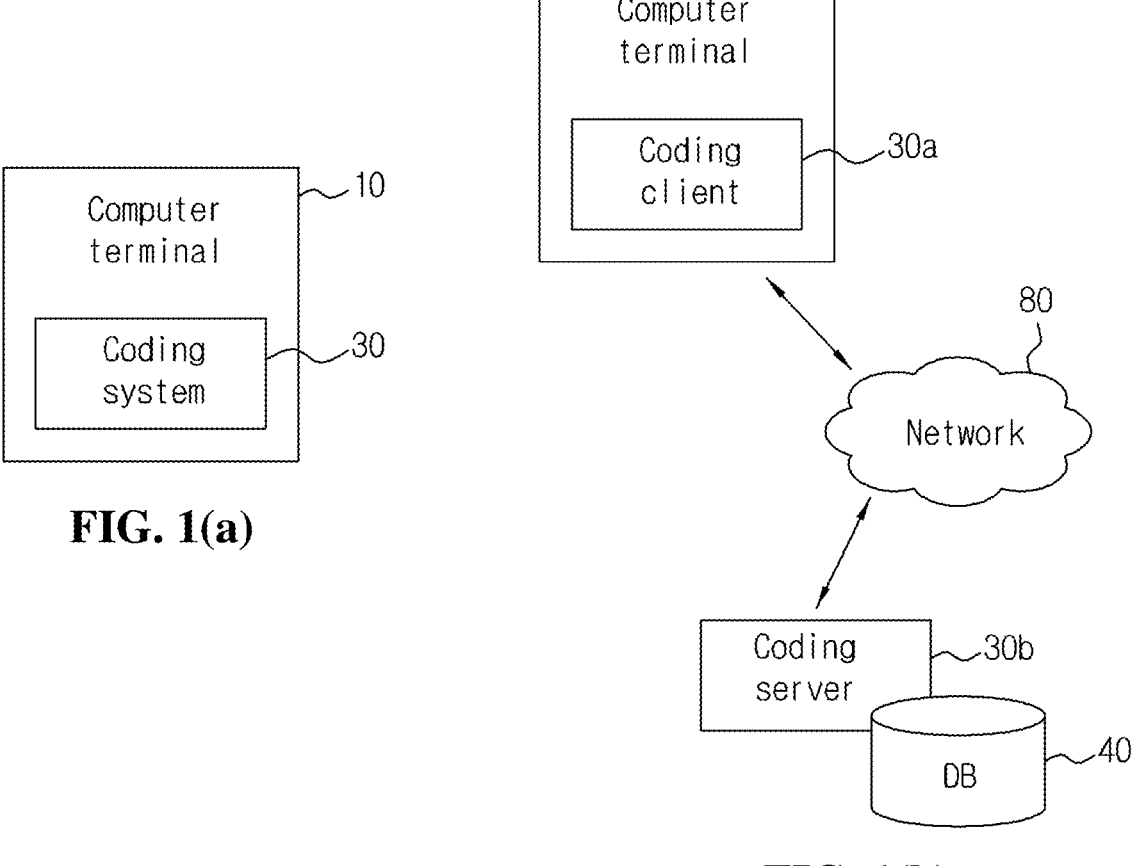
FIGS. 1(a) and 1(b) are block diagrams of the configuration of an overall system for implementing the present invention.

Hereinafter, embodiments for carrying out the present invention will be described in detail with reference to the accompanying drawings.

In addition, the same reference numeral indicates the same part in the description of the present invention, and repetitive description thereof will be omitted.

First, examples of the configuration of an overall system for implementing the present invention. will be described with reference to FIGS. 1(a) and 1(b).

As shown in FIG. 1(a), a method for coding 3D volumetric data according to the present invention (hereinafter referred to as coding method) may be implemented with a program system on a computer terminal 10 that receives and codes 3D volumetric data.

In other words, the coding method may be implemented as a program system 30 on a computer terminal 10 such as a PC, a smartphone or a tablet PC. Particularly, the coding method may be composed of a program system so as to be installed and executed on the computer terminal 10. The coding method provides a service for coding 3D volumetric data by using hardware or software resources of the computer terminal 10.

In addition, as shown in FIG. 1(b) in another embodiment, the coding method may be configured and executed as a server-client system composed of a coding client 30a on the computer terminal 10 and a coding server 30b.

Meanwhile, the coding client 30a and the coding server 30b may be implemented according to a typical client-server configuration scheme. In other words, functions of the entire system may be divided depending on the performance of the client or the amount of communication with the server. The coding system described later may be implemented in various forms of sharing according to the client-server configuration scheme.

Meanwhile, in another embodiment, the coding method may be implemented while being configured as one electronic circuit, such as an application specific integrated circuit (ASIC), in addition to being configured as a program to operate on a general purpose computer. Alternatively, the encoding method may be developed as a dedicated computer terminal that exclusively processes editing of a 3D mesh sequence having stable colors. Other possible forms may also be implemented.

Next, a method for encoding 3D volumetric data according to one embodiment of the present invention will be described with reference to FIGS. 2 to 6.

Figure 2:
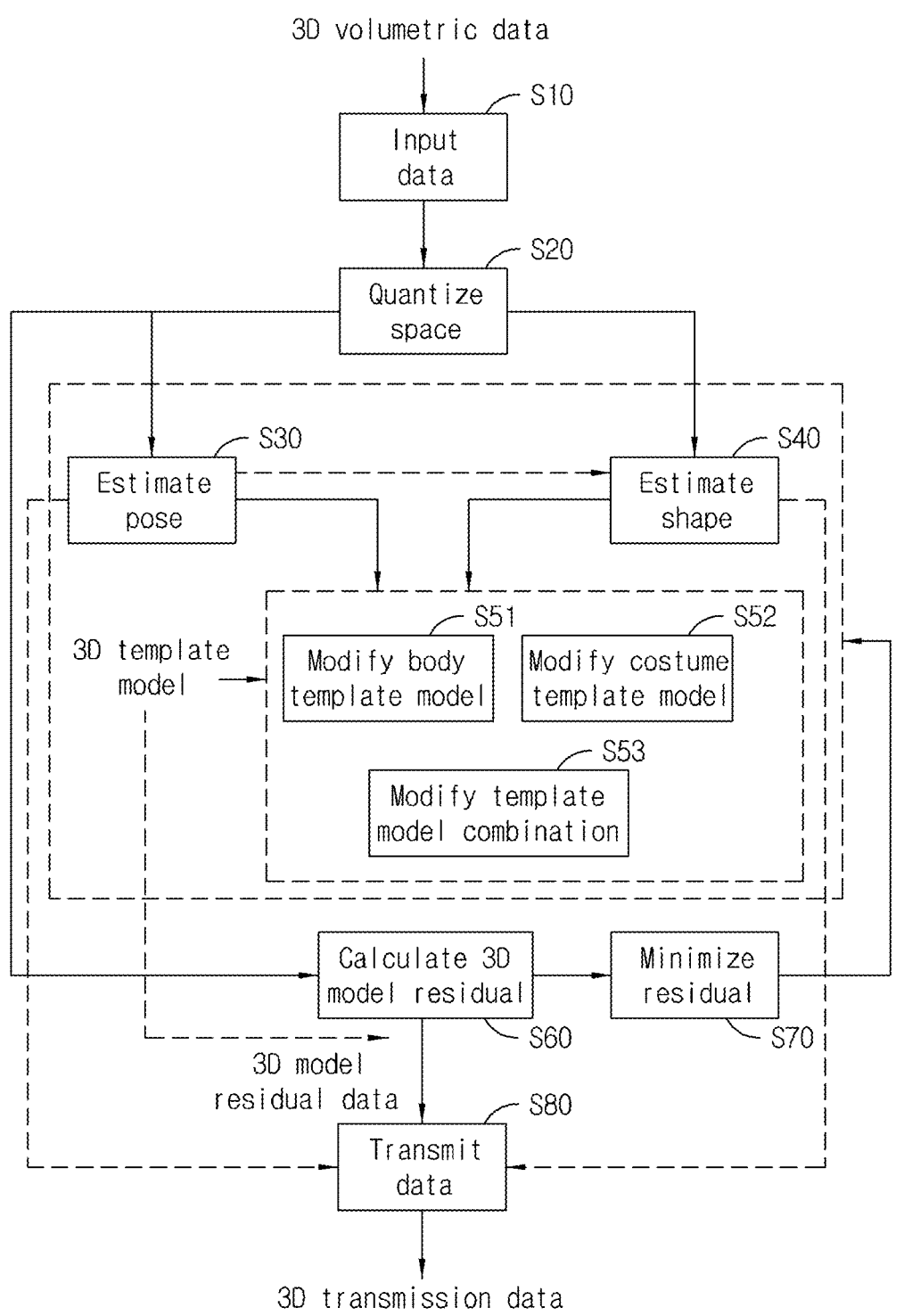
FIG. 2 is a flowchart explaining a method for encoding 3D volumetric data according to one embodiment of the present invention.
Figures 3A, 3B, 3C, 3D, 3E, 3F:
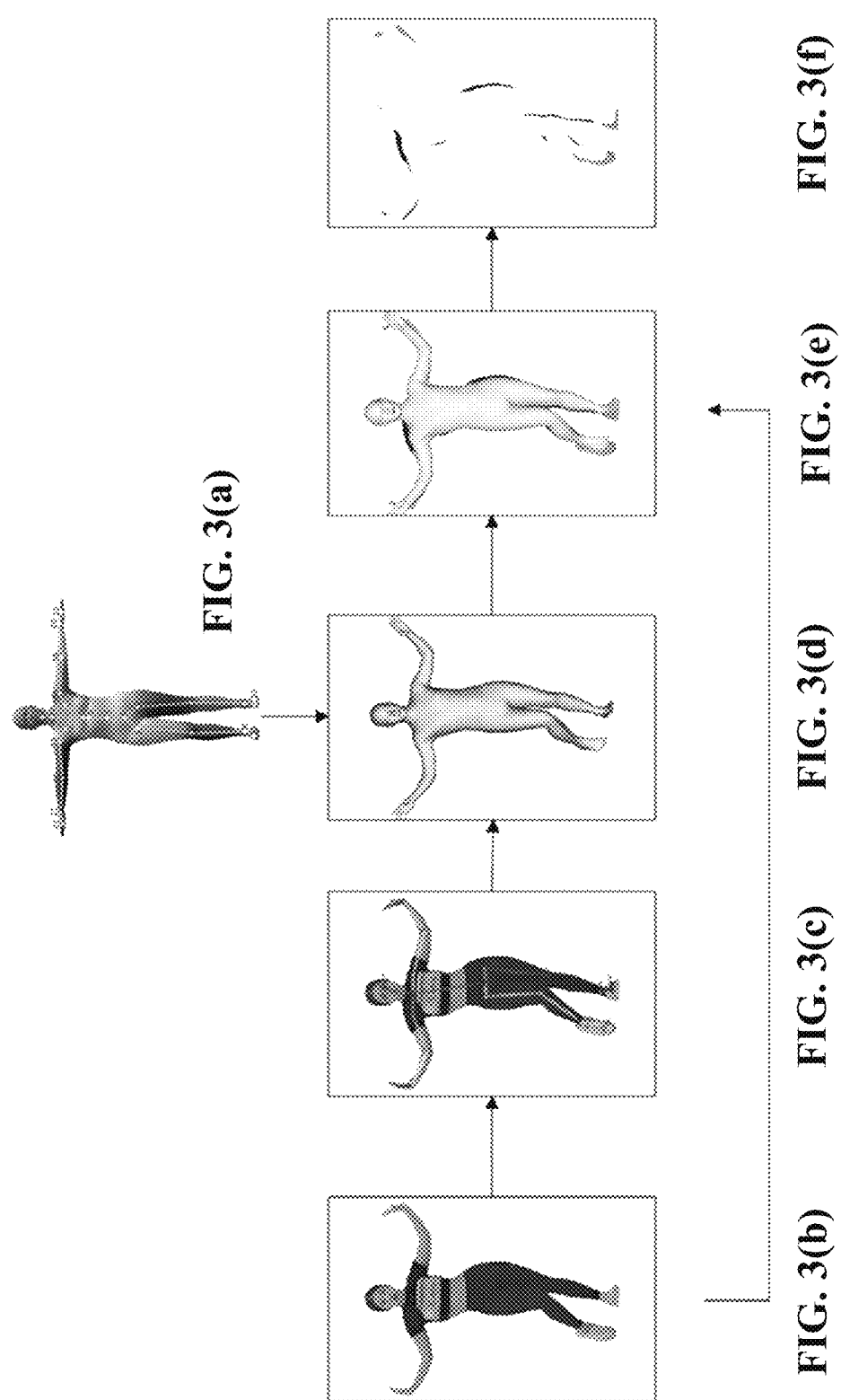
FIGS. 3(a)-3(f) show images illustrating a encoding process of the 3D volumetric data according to one embodiment of the present invention, and includes (a) a 3D template model, (b) 3D volumetric data, (c) pose and shape estimation data, (d) 3D volumetric model modification, (e) 3D volumetric data comparison, and (f) 3D volumetric residual data.

As shown in FIG. 2, the method for encoding 3D volumetric data according to the present invention includes the steps of: receiving 3D volumetric data (S10), quantizing the 3D volumetric data (S20), estimating a pose (S30), estimating a shape (S40), generating a 3D modification model from a 3D template model (S50), calculating a residual with the 3D volumetric data (S60), and generating transmission data (S80). In addition, a step of minimizing the residual (S70) may be further included.

FIGS. 3(a)-3(f) illustrate a process of actually processing the 3D volumetric data according to the process in FIG. 2.

First, 3D volumetric data is input (S10).

The 3D volumetric data is data representing a 3D virtual human and is composed of a data format in the form of a mesh or point cloud. Particularly, the 3D volumetric data refers to a volumetric model obtained directly through a camera system or the like. However, the 3D volumetric data is not limited to a specific approach.

Next, the 3D volumetric data is quantized (S20).

Because the mesh or point cloud constituting the 3D volumetric data may have infinite precision, the precision may be limited for encoding.

Preferably, an entire space of the 3D volumetric data is divided into unit areas, and 3D volumetric data within each unit area is integrated and set as one representative value (e.g., average, median value or the like).

Next, a 3D pose estimation data is generated by estimating a 3D pose from the input 3D volumetric data (S30). The 3D pose (estimation) data is 3D skeleton data including joints (nodes) and bones (skeleton).

In other words, 3D pose data may be directly estimated from the input 3D volumetric data, or 3D pose data may be estimated from a 2D image after the 2D image is obtained from the 3D volumetric data.

As one embodiment, a 2D image is obtained by projecting 3D volumetric data onto a 2D plane, and a 3D pose is estimated from the obtained 2D image. Artificial intelligence, such as deep learning network, or rule-based algorithms may be used for the 3D pose estimation from the 2D image for the body.

Meanwhile, 2D image does not contain all the 3D information on a 3D object (body). Accordingly, an error may inevitably exist in 3D information generated through inference or prediction from the 2D image. Accordingly, pose data is estimated from 2D images from two or more viewpoints, so that errors are corrected or minimized. For example, pose data may be estimated from the 2D images from the viewpoint, respectively, and a final value may be estimated using an average value and the like of overlapping pose data.

In addition, in another embodiment, a 3D pose may be estimated by using 3D data as it is. In other words, the 3D pose may be directly estimated from the 3D volumetric data.

An operation of the 3D volumetric data may be analyzed by estimating the 3D pose of the 3D volumetric data.

The following 3D pose estimation method is merely an embodiment and the present invention is not limited thereto.

Figure 4:
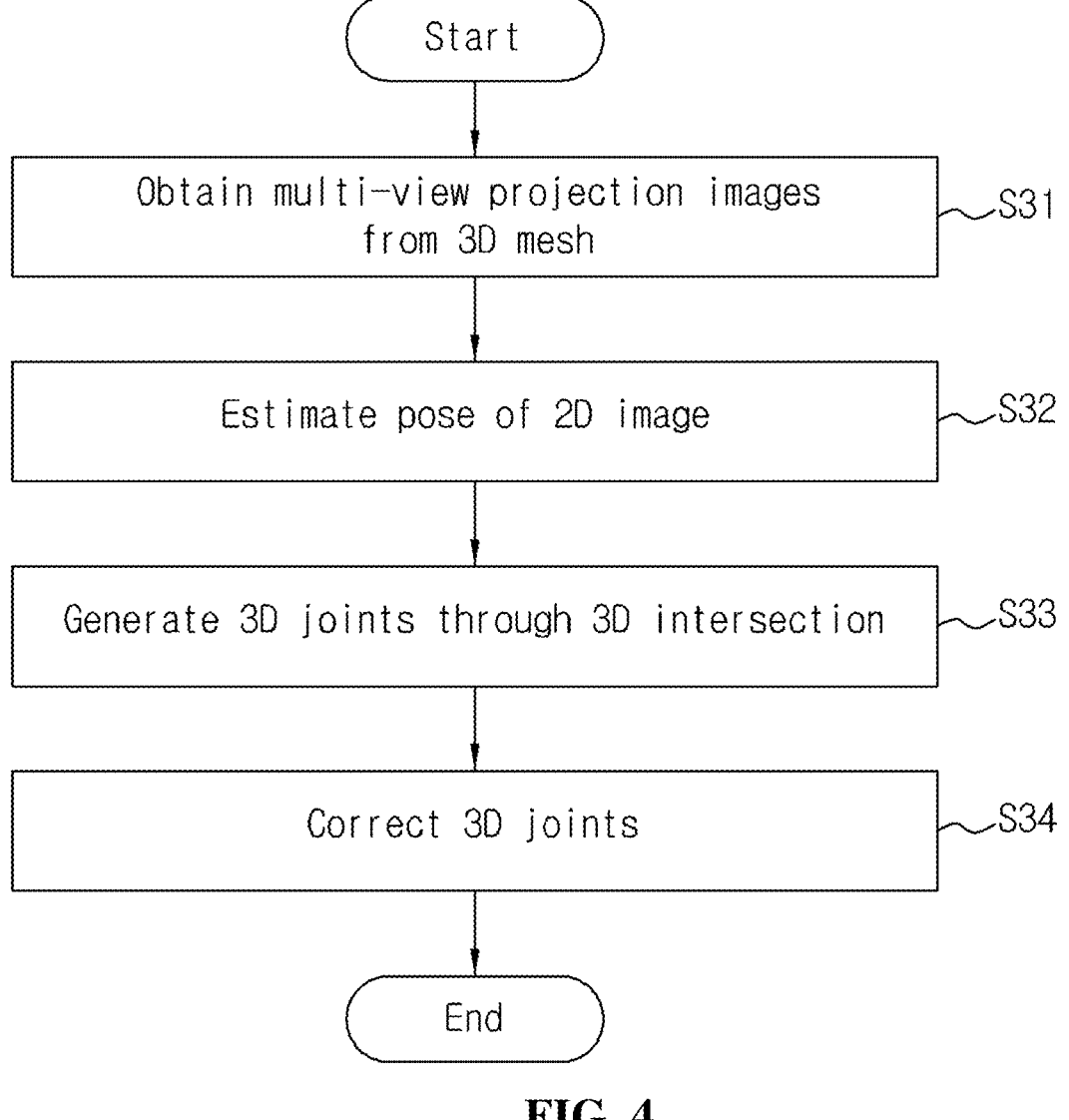
FIG. 4 is a flowchart showing a method for estimating a pose of a 3D mesh according to one embodiment of the present invention.

As shown in FIG. 4, first, in order to estimate the 3D pose of the 3D volumetric data, (multiple view) projection images of the 3D volumetric data viewed from multiple directions (four directions such as front, back, left and right) are generated (S31). Next, positions of 2D joints are extracted from the projection images by using an OpenPose library (S32), and approximate 3D joint positions are generated by calculating intersection points in a three-dimension (S33). Finally, a post-processing process is performed to extract positions of 3D joints with high-precision (S34).

Figure 5A:
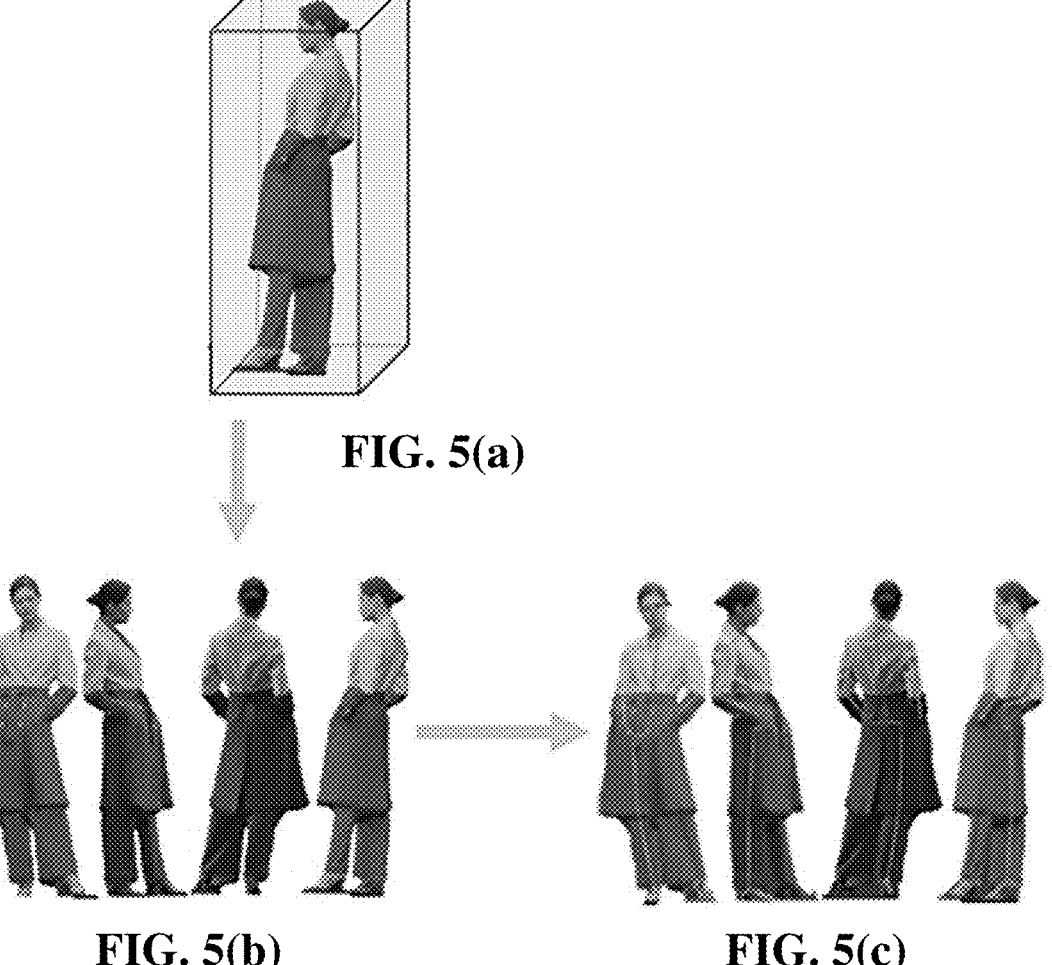

FIGS. 5($a$)-5($c$) illustrate a process of actually estimating the 3D pose data according to the method in FIG. 4.

First, the step of obtaining the projection image (S31) will be described.

When positions of 2D joints are estimated with the OpenPose for the projection images in multiple directions, the accuracy of the joint position estimated from the image projected from the front direction may be the highest. Accordingly, a spatial distribution of 3D coordinates of points constituting the 3D mesh is analyzed to find the front of the 3D mesh, and the front direction is rotated to be parallel to a Z-axis direction. In order to find the front direction, a principal component analysis (PCA) is used. The principal component analysis is used to find a principal component of distributed data.

When the PCA is applied to the 3D volumetric data, 3D vectors for x, y and z axes, which may most simply represent the distribution of the 3D volumetric data, may be obtained. Since a y-axis distribution serving as a vertical direction of an object is unnecessary to find the front, the 3D volumetric data is projected on an x-z plane, and the PCA is performed in this 2D plane. In the PCA, a covariance matrix is found first, and two eigenvectors for the matrix are obtained. A vector having a small eigenvalue from the two obtained eigenvectors indicates the front direction. The vectors found through the PCA are used and the front of the 3D mesh is rotated to be the z-axis.

After the front of the object is found, an AABB for determining a projection plane on a space is set. During a process of projecting the object from a three dimension to a 2D plane, coordinates from a world coordinate system are converted to coordinates on a projection plane through a model view projection (MVP) matrix, which is a 4×4 matrix.

Next, the step S32 of estimating the 2D pose in each of the projected 2D images will be described.

When four projection images are generated, 2D skeletons are extracted using the OpenPose.

The OpenPose refers to a project published by IEEE Conference on Computer Vision and Pattern Recognition (CVPR) 2017 and is a method developed at the University of Carnegie-Mellon in the United States. The OpenPose is a library based on a convolutional neural network (CNN) and capable of extracting features of bodies, hands, and faces of several persons from photographs in real time.

The characteristic of the above project is to quickly find poses of multiple persons. Before the OpenPose is announced, a top-down approach, which repeats detecting each person in a photograph and finding a pose for the detected person, has been mainly used to estimate poses of multiple persons.

The OpenPose is a type of bottom-up approach and improved in performance without repetitive processing. The bottom-up approach is an approach of estimating joints of all persons, tracing positions of joints, and regenerating the joints to positions corresponding to each person. In general, the bottom-up approach has a problem of determining a person to which joints belong. In order to compensate for the problem, the OpenPose uses part affinity fields capable of estimating a person to which a body part belongs.

The result of extracting the skeleton using the OpenPose is output as image and Javascript object notation (JSON) files.

Next, the step S33 of generating the 3D pose through 3D intersection and the step S34 of correcting will be described.

Figure 6A:
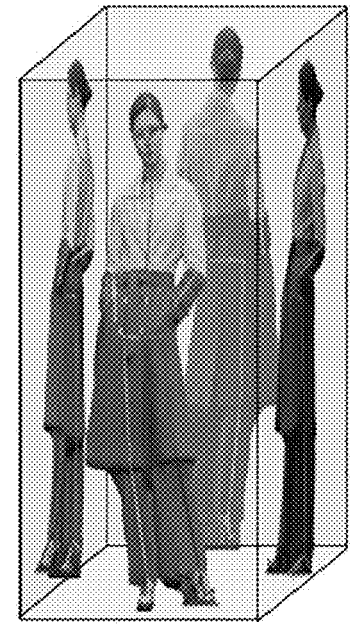
FIGS. 6(a) and 6(b) show exemplary diagrams of the process of estimating a 3D pose in the 3D mesh according to one embodiment of the present invention, and includes (a) a projection image of an axis-aligned bounding box (AABB), and (b) a pose error.
Figure 6B:
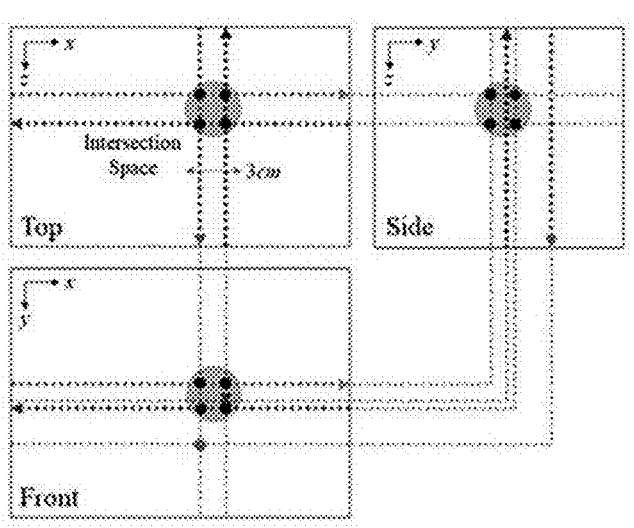

After a process of restoring from a 2D skeleton pixel coordinate system back to a 3D coordinate system, extracted joint coordinates are calculated on four projection planes located in a space. When matching coordinates on the four planes are connected, four coordinates intersecting in the space are obtained. FIG. 6($a$) illustrates that a left shoulder 3D joint of a 3D body model is extracted.

Meanwhile, 2D pose estimation always has an error, and the error causes a projection line that deviates from an intersection space. As shown in FIG. 6($b$), it can be confirmed that a red projection straight line at a rear side deviates from the intersection space when checked from a front and a side. Experimentally, a diameter of the intersection space is set in advance as 3 cm or the like. In other words, when a 3D virtual sphere is defined and then a virtual projection straight line does not pass through the space, a node by the virtual projection straight line are not included in the calculation of integrating 3D nodes.

In other words, an average point of the intersection space is set as a center, only candidate coordinates within a predetermined range from the center (e.g., a sphere having a diameter 1 or the like) are selected, and other coordinates are excluded.

After points at each view-point for the 3D nodes are defined by using the unremoved candidate coordinates, average coordinates are calculated. X and z coordinates are determined on the top, and y coordinates are determined on the side. The calculated x, y and z coordinates are required to match with x and y coordinates on the front. The above process is shown in FIG. 6(*b*). FIG. 5(*c*) visually displays results of applying a skeleton for the 3D volumetric data to a 3D model.

Next, shape estimation data is generated by estimating 3D shape data of the body and costume data for the input 3D volumetric data (S40).

In other words, 3D shape data may be directly estimated from the input 3D volumetric data, or 3D shape data may be estimated from a 2D image after the 2D image is obtained from the 3D volumetric data.

The 3D shape data includes 3D shape data of the body and costume data.

The 3D shape data of the body is data for determining whether a virtual person is thin or fat, short or tall, and the like. Preferably, the 3D shape data of the body is the same as shape data used in an SMPL model.

In addition, the costume data is data about a costume template model worn by a 3D human. The costume template model is a template that represents costume such as tops, bottoms, skirts, coats and shoes. Costume template models are built in advance. Preferably, the costume template model may also include hats, hairstyles and the like.

In other words, it is estimated which costume template model the costume belongs to among the pre-built costume template models from the 3D volumetric data or the projected 2D image by using neural network or the like. Multiple costume models may be estimated. For example, when a hat and shoes are worn, multiple costume models may be estimated, including hats, tops, bottoms, and shoes.

In addition, the costume template model may be adjusted by feature parameters such as (relative) length, size and width. In addition, the above specific parameters are estimated together when the costume template model is estimated, so that a costume template model that reflects the features may be estimated.

As one embodiment, after mapping the 3D volumetric data onto a 2D plane in a space, appearance data of the volumetric model is extracted from a 2D image. In other words, a 2D image from at least one viewpoint is obtained by mapping 3D volumetric data to at least one plane in a space. In addition, shape data is estimated from the at least one 2D image.

The 2D image does not contain all the 3D information on a 3D object (body). Accordingly, an error may inevitably exist in 3D information generated through inference or prediction from the 2D image. Accordingly, shape data is estimated from 2D images from two or more viewpoints, so that errors are corrected or minimized.

For example, 3D shape data may be extracted from each of the 2D images with multiple viewpoints, and the most suitable viewpoint may be selected among the viewpoints. In other words, accuracy (confidence) for each of the 2D images with multiple viewpoints is calculated, and 3D shape data is estimated from a 2D image with the highest accuracy.

For another example, shape data is estimated from 2D images at each viewpoint, and a final value is estimated using an average value or the like of overlapping shape data.

Particularly, Artificial intelligence, such as deep learning network, or rule-based algorithms may be used to estimate a 3D shape from a 2D image (video). The 3D shape estimation method is merely an embodiment and the present invention is not limited thereto.

An external shape of 3D volumetric data may be estimated by estimating the shape of 3D volumetric data.

Through the previous pose and volume estimation processes (S30 and $40), an appearance of a 3D volumetric model may be newly generated or restored.

The shape data may be data in the form of a latent variable generated through deep learning, or data such as displacement required to be adjusted for each part. In the former case, shape data is estimated through deep learning, and in the latter case, shape data is estimated through a rule-based algorithm.

Next, a 3D estimation model is generated by modifying the 3D template model (S50).

Multiple (N) 3D template models are defined and stored (retained) in advance.

The 3D template model includes a 3D body template model and a 3D costume template model.

The 3D body template model is a model that represents a 3D virtual human, and various 3D virtual humans may be set using predetermined feature parameters. Preferably, the feature parameter of the 3D template model is a parameter representing a feature of the virtual human, and is divided into a shape parameter and a pose parameter. The shape parameter is a variable that determines whether the virtual human is thin or fat, short or tall, and the like. The pose parameter is a variable that determines a motion or pose of a virtual human.

In addition, the 3D costume template model is a model that represents a 3D costume, and a 3D costume with a specific pose may be set by using the pose data. At this timing, the previously estimated pose estimation data is used for pose data.

A modified 3D template model (or 3D body estimation model) is obtained by applying the pose and shape data estimated in the previous steps (S30, S40) to the 3D template model.

In other words, values of the feature parameters of the 3D body template model is set using pose and shape data. When the set parameter values are entered into the 3D body template model, a 3D body estimation model may be generated. The 3D body estimation model may have a form very similar to the virtual human having the original 3D volumetric data.

In addition, a 3D costume template model (or 3D costume estimation model) is obtained by applying the pose estimation data to the 3D costume template model. In other words, the 3D costume template model may be expressed as a 3D costume model in various postures according to poses. A 3D costume model is estimated by applying pose estimation data.

In addition, a 3D estimation model is generated by combining the 3D costume estimation model with the 3D body estimation model. According to a size or a position of the 3D body estimation model, the costume estimation model may be modified and combined.

In summary, in order to modify the 3D template model, first, pose estimation data and shape estimation data of the body are applied to modify the 3D body template model (S51), the pose estimation data is applied to modify the costume template model (S52), and the modified costume template model is combined with the modified 3D body template model to generate a final 3D estimation model (S53).

Figure 7A:
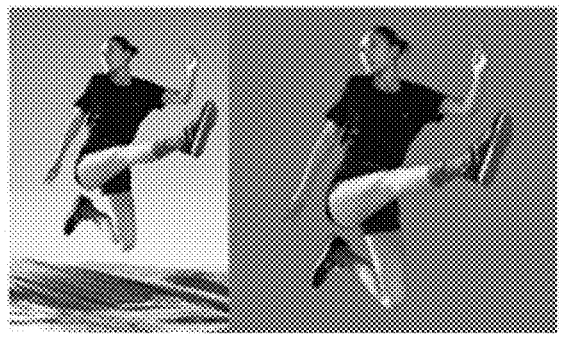
FIGS. 7(a)-7(c) show exemplary diagrams of a process of modifying a template model according to one embodiment of the present invention.
Figures 7B, 7C:
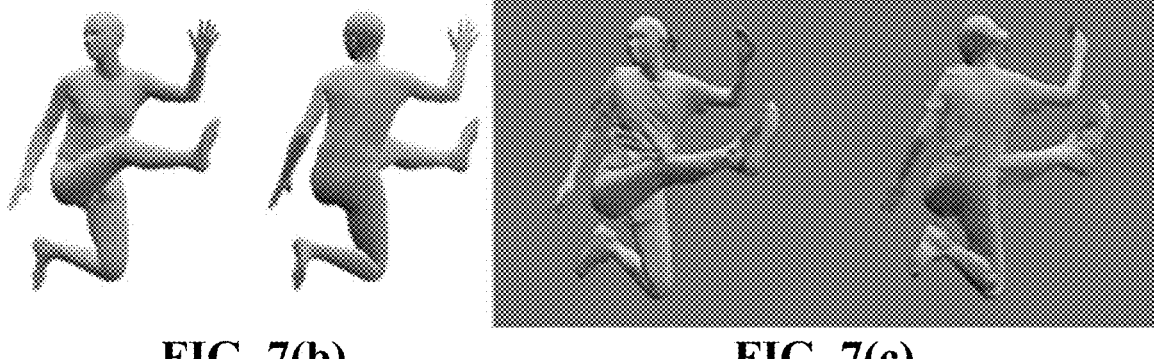

FIGS. 7(*a*)-7(*c*) show 3D volumetric data and 3D template models modified therefrom. In other words, FIG. 7(*a*) is 3D volumetric data, FIG. 7(*b*) is a 3D body template model modified by the pose and shape estimation data of the body, and FIG. 7(*c*) is a model obtained by combining the costume template model with the body template model of FIG. 7(*b*).

A deep learning network may be used to modify the 3D template model, or a rule-based algorithm may be used. Preferably, a deep learning model based on SMPL-X is used to modify the 3D template model.

The skinned multi-person linear (SMPL) model refers to a type of data format generated to elaborate the human body into a 3D mesh and is widely used in the fields of artificial intelligence and graphics. In addition, the SMPL-X is a model adding fingers to the SMPL. The SMPL model is generated to find a human body included in a 2D image, estimate a pose of the body, and then apply the estimated pose to a previously defined human body model take a corresponding pose. In addition, after body features in the image are analyzed, the human body model is modified to have features similar to the features. Accordingly, finally, the human body model in the form of a 3D mesh similar to the human included in the image may be generated.

Next, a residual of the 3D volumetric data with respect to the 3D estimation model is calculated (S60).

In other words, a difference or residual is calculated between 3D estimation models for the 3D volumetric data. The residual is a residual in a 3D space (particularly, quantized space). For example, the residual may be calculated as a difference between a 3D position in a space of the 3D volumetric data and a 3D position in a space of the 3D estimation model.

Precision and quantity of the residual are determined depending on a size unit divided for the space in the space quantization step S20.

Next, the residual is minimized (S70).

When the residual of the 3D model does not reach a predetermined level (critical level), the pose and shape estimation steps S30 and S40 may be performed repeatedly. A position and an angle of a 2D plane (projection plane) defined in a space are newly defined, so that a pose and a shape may be estimated using new parameters in the pose and shape estimation steps S30, S40.

In other words, the position and the angle of the 2D projection plane or projection point are newly defined, and the pose and shape estimation steps S30 and S40 and the subsequent steps S50 and S60 are repeated using the newly defined parameters.

Next, transmission data is generated (S80).

The transmission data includes pose estimation data, shape estimation data, residual data of a 3D volumetric model, and the like. In addition, when multiple 3D template models are used instead of one, information about which 3D template model has been used is required to be transmitted together.

The pose estimation data, the shape estimation data, and the 3D volumetric model residual data may be compressed again in space and time aspects and transmitted. Each piece of data may be compressed and transmitted in a variety of common manners.

Next, the method for decoding 3D volumetric data according to one embodiment of the present invention will be described with reference to FIG. 8.

Figure 8:
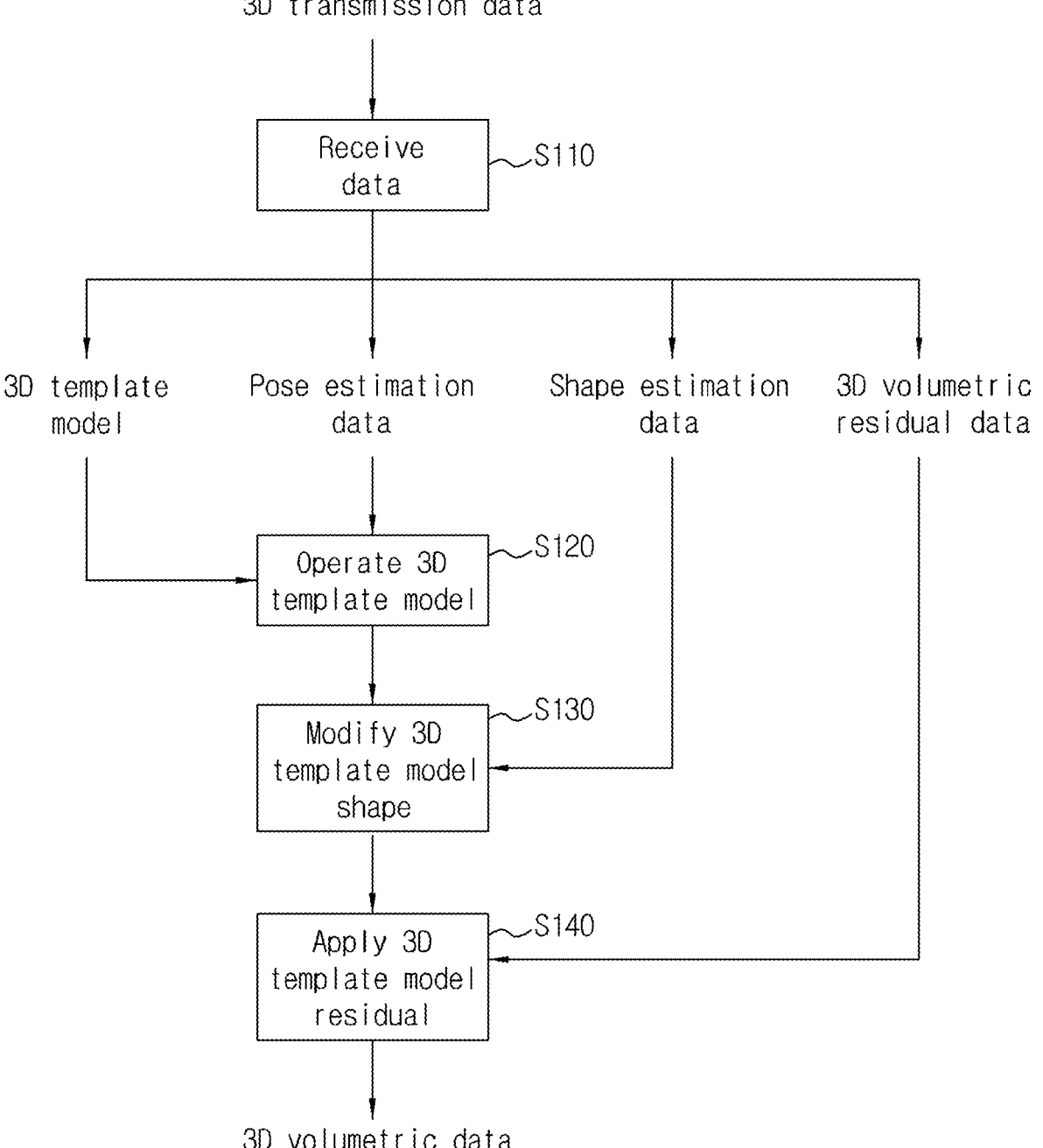
FIG. 8 is a flowchart explaining a method for decoding the 3D volumetric data according to one embodiment of the present invention.

As shown in FIG. 8, first, 3D transmission data is received (S110).

The 3D transmission data includes pose estimation data, shape estimation data, residual data of a 3D volumetric model, and the like. In addition, a 3D template model may be further included.

Next, the 3D template model (data shared in advance between a encoder and a decoder) is animated by using the transmitted pose estimation data, so that the 3D template model is modified into a volumetric model performing the same motion as the transmitted pose (S120).

Next, the transmitted shape estimation data is used, so that an appearance of the template model having a motion with the transmitted pose is delicately modified (S130).

Next, the residual data of the 3D volumetric model is added to the 3D template model having the modified appearance, so that a model is restored to be identical to the initially input 3D volumetric data.

The present implemented by the inventor has been described in detail according to the above embodiments, however, the present invention is not limited to the embodiments and may be modified variously within the scope without departing from the invention.

What is claimed is:

1. A method for encoding 3D volumetric data, the method comprising the steps of:
   (a) receiving the 3D volumetric data;
   (b) quantizing the 3D volumetric data;
   (c) estimating a 3D pose from the 3D volumetric data to generate pose estimation data;
   (d) estimating a 3D shape from the 3D volumetric data to generate shape estimation data;
   (e) generating a 3D estimation model by modifying a predefined 3D template model by using the pose estimation data and the shape estimation data;
   (f) calculating a residual of the 3D volumetric data with respect to the 3D estimation model; and
   (g) generating transmission data including the pose estimation data, the shape estimation data, and residual data,
   wherein the predefined 3D template model includes a 3D body template model representing a 3D virtual human body and a 3D costume template model representing a 3D costume,
   wherein the shape estimation data includes body shape estimation data and the 3D costume template model, and
   wherein step (e) includes generating the 3D estimation model by applying the pose estimation data and the body shape estimation data to modify the 3D body template model, applying the pose estimation data to modify the 3D costume template model, and combining the modified 3D costume template model with the modified 3D body template model.

2. The method of claim 1, wherein step (c) or (d) includes:
   obtaining a 2D image by projecting the 3D volumetric data onto a 2D plane, and
   estimating the pose estimation data or the shape estimation data from the 2D image.

3. The method of claim 2, wherein step (c) or (d) includes:
   obtaining 2D images from two or more viewpoints by projecting the 3D volumetric data onto two or more 2D planes to estimate the pose estimation data or the shape estimation data from the 2D images, thereby correcting or minimizing an error.

4. The method of claim 1, wherein step (f) includes:
   calculating the residual by a difference between a 3D position in a space of the 3D volumetric data and a 3D position in a space of the 3D estimation model.

5. The method of claim 1, further comprising:
   (h) defining a projected position and a projected angle when the residual is below a predetermined threshold level, and repeating steps (c) to (f).

6. The method of claim 1, wherein step (g) includes:

including, in the transmission data, data indicating which
3D template models are used when two or more of the
3D template models are used.

\* \* \* \* \*